United States Patent [19]
Pastrick et al.

[11] Patent Number: 6,099,155
[45] Date of Patent: Aug. 8, 2000

[54] SECURITY LIGHTED VEHICULAR EXTERIOR REARVIEW MIRROR SYSTEM

[75] Inventors: Todd W. Pastrick, Grand Haven; Linda K. Molenkamp, Fruitport; Roger L. Koops, Holland, all of Mich.

[73] Assignee: Donnelly Corporation, Holland, Mich.

[21] Appl. No.: 09/420,658

[22] Filed: Oct. 19, 1999

Related U.S. Application Data

[63] Continuation of application No. 09/232,316, Jan. 18, 1999, which is a continuation of application No. 08/934,490, Sep. 19, 1997, Pat. No. 5,863,116, which is a continuation of application No. 08/607,285, Feb. 26, 1996, Pat. No. 5,669,705, which is a continuation of application No. 08/333,412, Nov. 2, 1994, Pat. No. 5,497,305, which is a continuation of application No. 08/011,947, Feb. 1, 1993, Pat. No. 5,371,659.

[51] Int. Cl.[7] .................................................. B60Q 1/24
[52] U.S. Cl. ..................... 362/494; 362/540; 362/276; 315/84
[58] Field of Search ..................... 315/84; 362/140–144, 362/494, 496, 501, 511, 520, 522, 540, 542, 546, 276, 802; 340/468, 475; 359/602, 604, 876, 877

[56] References Cited

U.S. PATENT DOCUMENTS

| 1,096,452 | 5/1914 | Perrin | 362/495 |
|---|---|---|---|
| 1,278,741 | 9/1918 | Phelps | 362/540 |
| 1,353,253 | 9/1920 | Livingston et al. | 362/494 |

(List continued on next page.)

FOREIGN PATENT DOCUMENTS

| 0738627A2 | 10/1996 | European Pat. Off. . |
|---|---|---|
| 2612136 | 3/1988 | France . |
| 2618397 | 7/1988 | France . |

(List continued on next page.)

OTHER PUBLICATIONS

Commonly assigned copending U.S. application entitled "A Security Lighted Vehicular Exterior Rearview Mirror System," Serial No. 09/232,316, filed Jan. 18, 1999, by Todd W. Pastrick et al.

Commonly assigned pending U.S. application entitled "Vehicle Exterior Mirror System With Signal Light," Serial No. 09/102,414, filed on Jun. 22, 1998, by Todd W. Pastrick et al.

Commonly assigned pending U.S. application entitled "Vehicular Exterior Rearview Mirror System With Signal Light Assembly," Serial No. 09/259,815, filed on Feb. 26, 1999, by Todd W. Pastrick et al.

(List continued on next page.)

*Primary Examiner*—Alan Cariaso
*Attorney, Agent, or Firm*—Van Dyke, Gardner, Linn & Burkhart, LLP

[57] ABSTRACT

A floodlight that is adapted to projecting a pattern of light from the housing of a vehicle exterior mirror on an area adjacent a portion of the vehicle in order to create a lighted security zone in that area. The pattern extends laterally onto the vehicle and downwardly and rearwardly of the mirror housing. In this manner, the lighted security zone extends from the vehicle door to the rear of the vehicle. An actuator for the floodlight includes a base unit in the vehicle and a remote transmitter wherein the base unit is responsive to a signal from the remote transmitter in order to actuate the floodlight. The actuator may further include a lockout device in order to prevent actuation of the floodlight during operation of the vehicle. A signal light is additionally included in the exterior mirror housing in order to project a second pattern of light from the mirror housing extending laterally away from the vehicle and rearwardly of the vehicle. In this manner, the second pattern cannot be directly observed by the driver of the vehicle but may be observed by the driver of another vehicle passing the equipped vehicle. The signal light operates in unison with a turn signal, brake signal, or both, of the equipped vehicle.

114 Claims, 8 Drawing Sheets

U.S. PATENT DOCUMENTS

| | | | |
|---|---|---|---|
| 1,415,465 | 9/1922 | Nigh | 362/494 |
| 1,563,258 | 11/1925 | Cunningham | 362/540 |
| 2,273,570 | 2/1942 | Greenlees | 362/501 |
| 2,295,176 | 9/1942 | Kelly | 362/494 |
| 2,457,348 | 12/1948 | Chambers | 362/540 |
| 2,511,971 | 6/1950 | Dalton | 362/494 |
| 2,562,687 | 7/1951 | Anderson | 362/100 |
| 3,596,079 | 7/1971 | Clark | 362/144 |
| 4,041,301 | 8/1977 | Pelchat | 362/100 |
| 4,205,325 | 5/1980 | Haygood et al. | 340/870.11 |
| 4,258,352 | 3/1981 | Lipschutz | 340/531 |
| 4,274,078 | 6/1981 | Isobe et al. | 362/494 |
| 4,342,210 | 8/1982 | Denningham | 70/278.1 |
| 4,446,380 | 5/1984 | Moriya et al. | 307/10.4 |
| 4,475,100 | 10/1984 | Duh | 362/494 |
| 4,661,800 | 4/1987 | Yamazaki | 362/494 |
| 4,688,036 | 8/1987 | Hirano et al. | 340/825.69 |
| 4,809,137 | 2/1989 | Yamada | 362/494 |
| 4,866,417 | 9/1989 | DeFino et al. | 340/429 |
| 4,881,148 | 11/1989 | Lambropoulos et al. | 361/172 |
| 4,890,907 | 1/1990 | Vu et al. | 350/605 |
| 4,916,430 | 4/1990 | Vu et al. | 340/463 |
| 5,014,167 | 5/1991 | Roberts | 362/494 |
| 5,017,903 | 5/1991 | Krippelz, Sr. | 340/472 |
| 5,038,255 | 8/1991 | Nishihashi | 362/547 |
| 5,049,867 | 9/1991 | Stouffer | 340/426 |
| 5,059,015 | 10/1991 | Tran | 359/844 |
| 5,109,214 | 4/1992 | Heidman, Jr. | 340/475 |
| 5,113,182 | 5/1992 | Suman et al. | 340/825.31 |
| 5,132,882 | 7/1992 | Alder | 362/503 |
| 5,151,824 | 9/1992 | O'Farrell | 359/604 |
| 5,179,471 | 1/1993 | Caskey et al. | 359/603 |
| 5,206,562 | 4/1993 | Matsuno et al. | 315/84 |
| 5,207,492 | 5/1993 | Roberts | 362/30 |
| 5,303,130 | 4/1994 | Wei et al. | 362/494 |
| 5,313,335 | 5/1994 | Gray et al. | 359/839 |
| 5,371,659 | 12/1994 | Pastrick et al. | 362/494 |
| 5,402,103 | 3/1995 | Tashiro | 340/475 |
| 5,497,305 | 3/1996 | Pastrick et al. | 362/494 |
| 5,497,306 | 3/1996 | Pastrick | 362/494 |
| 5,499,169 | 3/1996 | Chen | 362/494 |
| 5,624,176 | 4/1997 | O'Farrell et al. | 362/494 |
| 5,660,457 | 8/1997 | Lyons | 362/494 |
| 5,669,699 | 9/1997 | Pastrick et al. | 362/494 |
| 5,669,704 | 9/1997 | Pastrick | 362/494 |
| 5,669,705 | 9/1997 | Pastrick et al. | 362/494 |
| 5,823,654 | 10/1998 | Pastrick et al. | 362/494 |
| 5,863,116 | 1/1999 | Pastrick et al. | 362/494 |
| 5,871,275 | 2/1999 | O'Farrell et al. | 362/494 |
| 5,879,074 | 3/1999 | Pastrick et al. | 362/494 |

FOREIGN PATENT DOCUMENTS

| | | |
|---|---|---|
| 2634372 | 2/1978 | Germany . |
| 3614882 | 5/1987 | Germany . |
| 3635473 | 4/1988 | Germany . |
| 3635471 | 5/1988 | Germany . |
| 3803510A | 9/1988 | Germany . |
| 58-188733 | 4/1983 | Japan . |
| 62-218248 | 9/1987 | Japan . |
| 1239273 | 9/1989 | Japan . |
| 3050044 | 4/1991 | Japan . |
| 61188242 | 8/1996 | Japan . |
| 1555541 | 11/1979 | United Kingdom . |
| 2129749 | 5/1984 | United Kingdom . |
| 2161440A | 1/1986 | United Kingdom . |
| 2266870 | 11/1993 | United Kingdom . |
| 2275329A | 8/1994 | United Kingdom . |

OTHER PUBLICATIONS

Commonly assigned pending U.S. application enetitled "Universal Exterior Vehicle Security Light," Serial No. 09/174,757, filed on Oct. 19, 1998, Todd W. Pastrick et al.

Commonly assigned pending U.S. application entitled "Vehicle Exterior Mirror System With Signal Light," Serial No. 09/335,010, filed on Jun. 17, 1999, by Todd W. Pastrick et al.

Search Report from related European Patent Application No. EP 0 738 627.

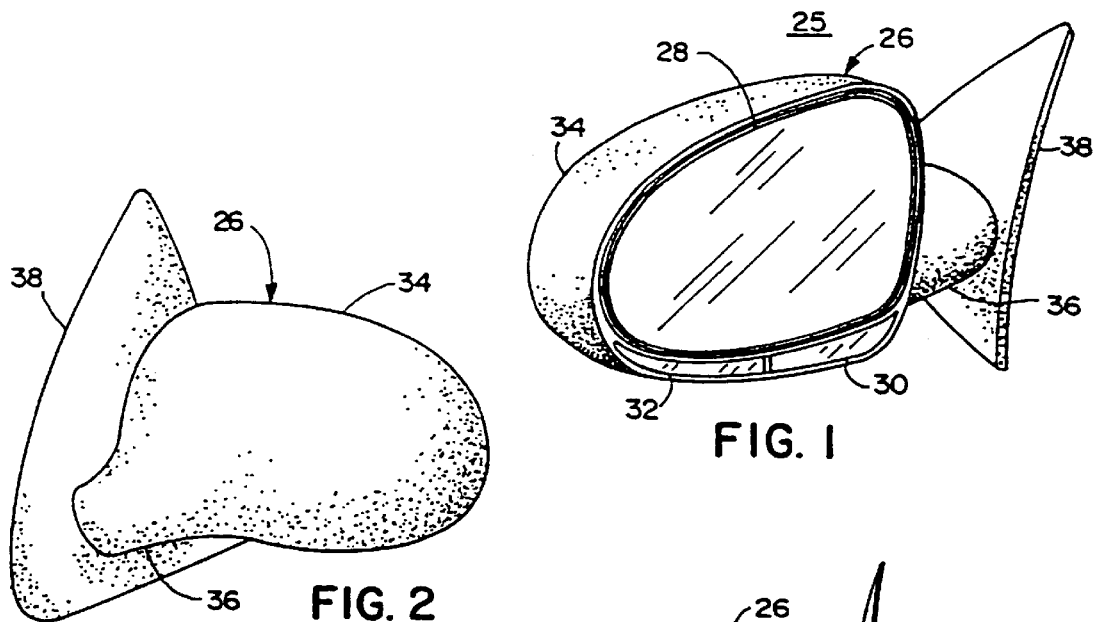
FIG. 1
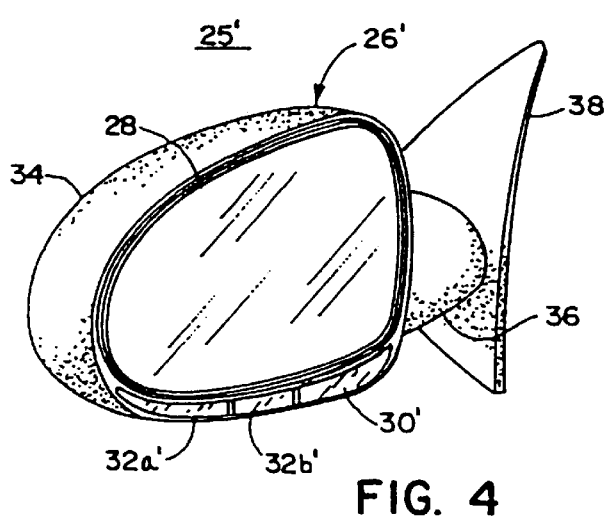
FIG. 2
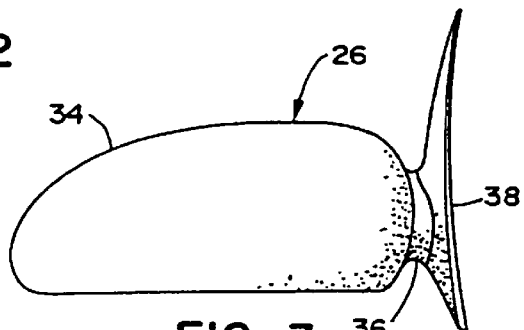
FIG. 3
FIG. 4

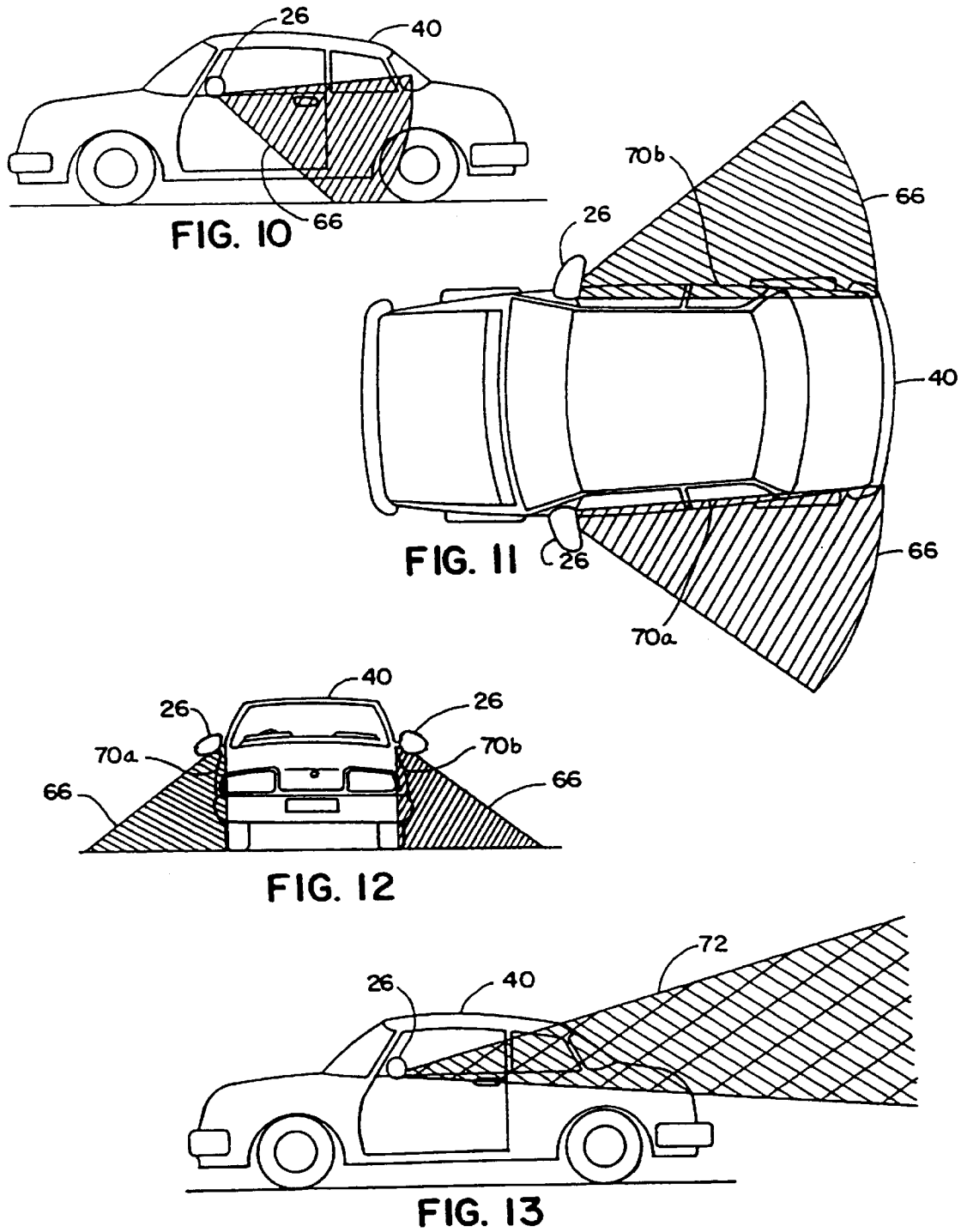

SECURITY LIGHTED VEHICULAR EXTERIOR REARVIEW MIRROR SYSTEM

CROSS REFERENCE TO RELATED APPLICATIONS

This is a continuation of prior application Ser. No. 09/232,316, filed on Jan. 18, 1999, which is a continuation of application Ser. No. 08/934,490, filed on Sep. 19, 1997, now Pat. No. 5,863,116, which is a continuation of application Ser. No. 08/607,285, filed on Feb. 26, 1996, now Pat. No. 5,669,705, which is a continuation of application Ser. No. 08/333,412, filed on Nov. 2, 1994, now Pat. No. 5,497,305, which is a continuation of application Ser. No. 08/011,947, filed on Feb. 1, 1993, now Pat. No. 5,371,659.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

SUMMARY OF THE INVENTION

The present invention is intended to provide a personal safety feature for a vehicle in the form of a floodlight adapted to projecting light generally downwardly on an area adjacent a portion of the vehicle in order to create a lighted security zone in the area. Advantageously, the floodlight is preferably positioned in the housing of an exterior mirror having a reflective element also positioned in the housing. According to an aspect of the invention, an actuator is provided for the floodlight including a base unit in the vehicle and a remote transmitter. The base unit is responsive to a signal from the remote transmitter in order to actuate the floodlight. This allows the vehicle operator to actuate the floodlight from a distance in order to establish the security zone prior to approaching the vehicle.

According to another aspect of the invention, an actuator for the floodlight includes a lockout device in order to prevent actuation of the floodlight during operation of the vehicle. According to yet a further aspect of the invention, a signal light that is adapted to projecting light generally rearwardly of the vehicle is included in the exterior mirror housing. An actuator for the warning light is connected with the stoplight circuit, turn signal circuit, or both the stoplight and turn signal circuit, of the vehicle in order to actuate the warning light when either the stoplight or turn signal is being actuated.

According to yet another aspect of the invention, the floodlight is adapted to projecting a pattern of light from the housing on an area adjacent a portion of the vehicle that extends laterally onto the vehicle and downwardly and rearwardly of the vehicle. In this manner, a security zone is established from the vehicle door to the rear of the vehicle. The signal light is adapted to projecting a pattern of light extending laterally away from the vehicle and rearwardly of the vehicle. In this manner, the pattern generated by the signal light cannot be substantially observed by a driver of the vehicle. However, the pattern generated by the signal light may be observed by a driver of another vehicle passing the vehicle equipped according to the invention.

The floodlight and signal lights may be generated by a light emitting diode positioned in the housing, a vacuum fluorescent lamp positioned in the housing, an incandescent lamp positioned in the housing or a light source in the vehicle and a light pipe between the light source and the mirror housing.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The provision for remote actuation of the security light provides a deterrent to ward off persons lurking around the protected vehicle while the users are still at a safe distance from the vehicle. The provision for a lockout circuit ensures that the security light will not inadvertently be actuated while the vehicle is in motion. The invention, further, conveniently combines a signal light that acts in unison with the vehicle's turn signal, brake light, or both, with the security light in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWINGS

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view as FIG. 1 of an alternative embodiment of the invention;

FIG. 10 is a side elevation of a vehicle illustrating the security zone light pattern generated by a security light according to the invention;

FIG. 11 is a top plan view of the vehicle and light pattern in FIG. 10;

FIG. 12 is a rear elevation of the vehicle and light pattern in FIG. 10;

FIG. 13 is a side elevation of a vehicle illustrating the light pattern generated by a signal light useful with the invention;

DESCRIPTION OF THE PREFERRED EMBODIMENT

Figure 5:
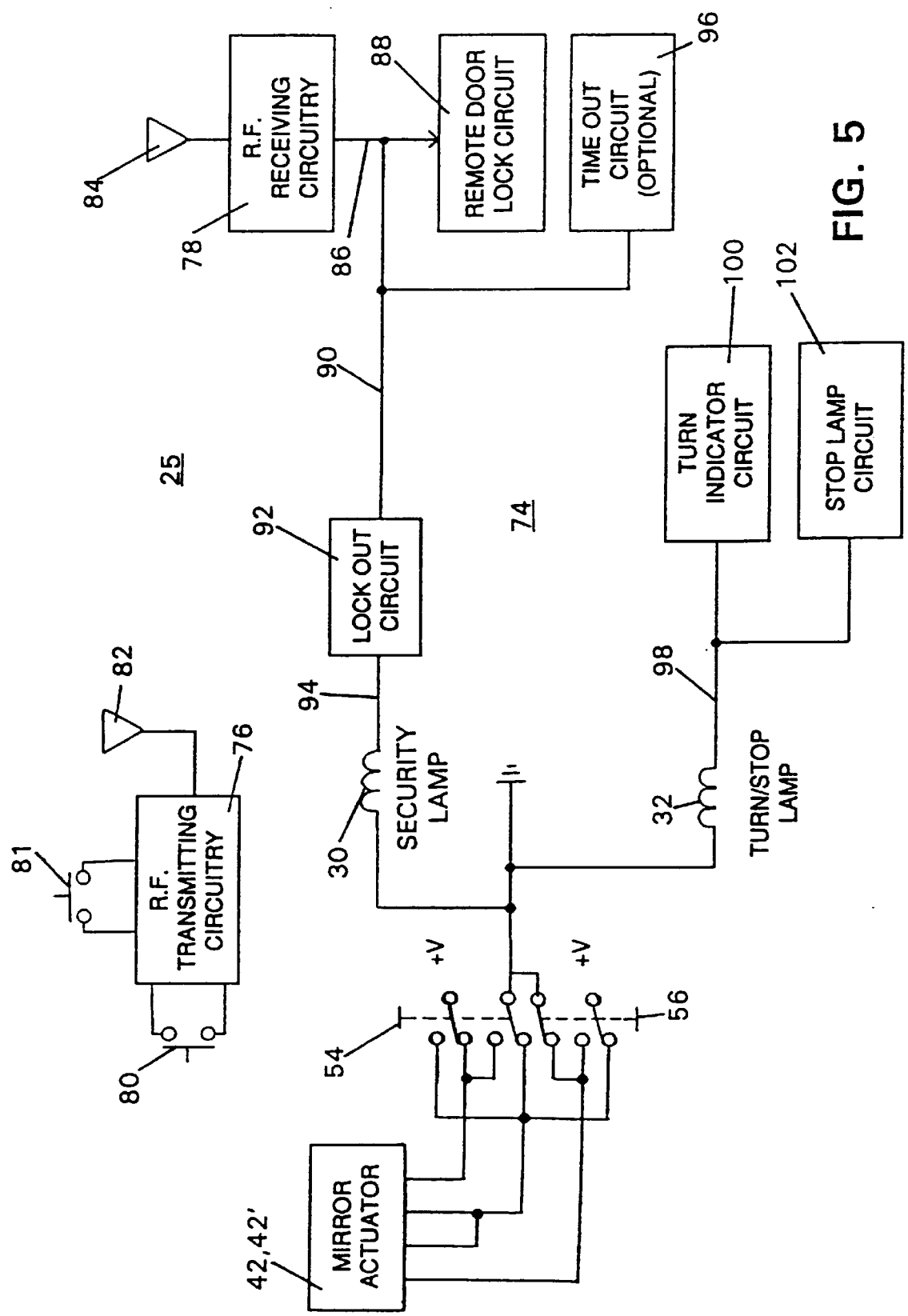
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

Figure 7:
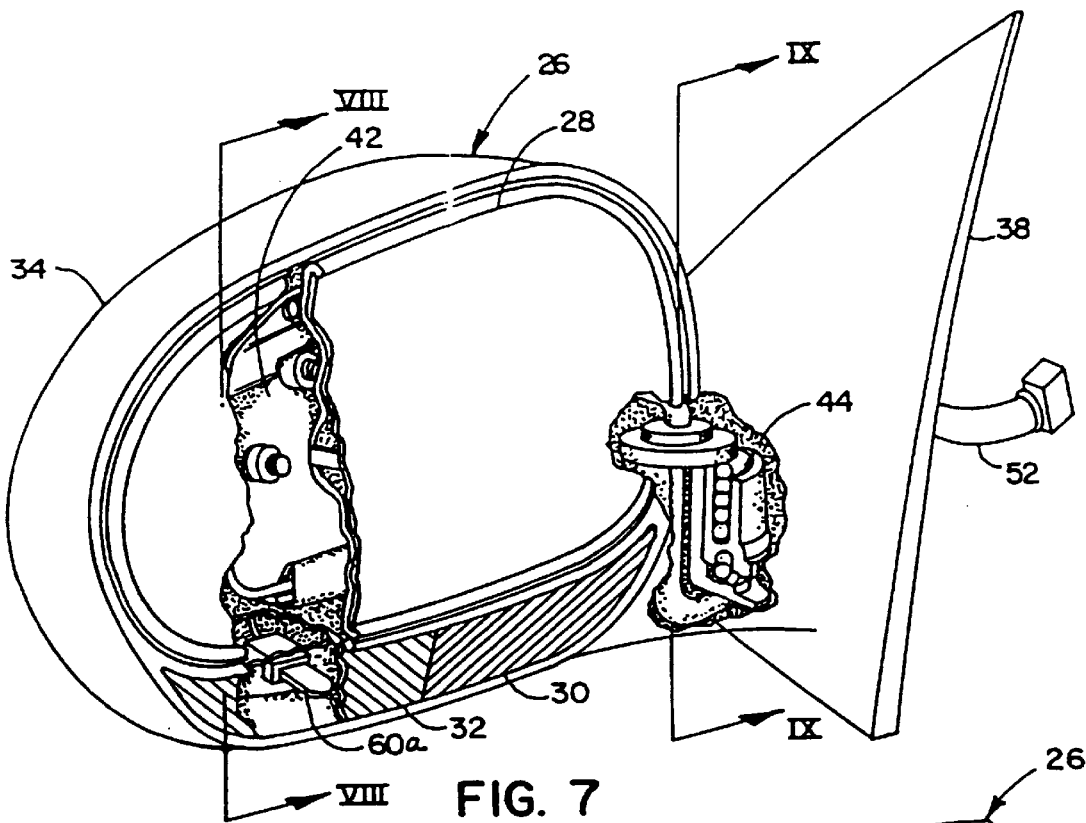
FIG. 7 is a breakaway perspective view of the system in FIG. 1 revealing internal components thereof.
Figure 9:
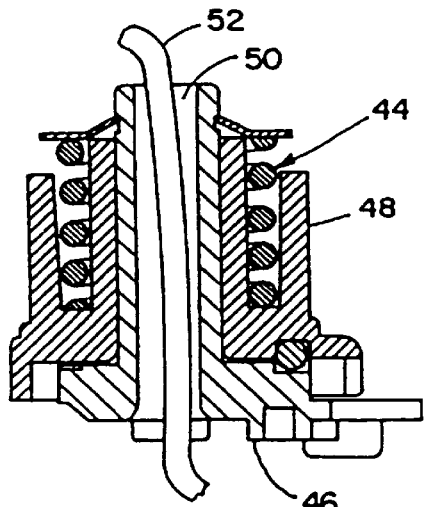
FIG. 9 is a sectional view taken along the lines IX—IX in FIG. 7.
Figure 8:
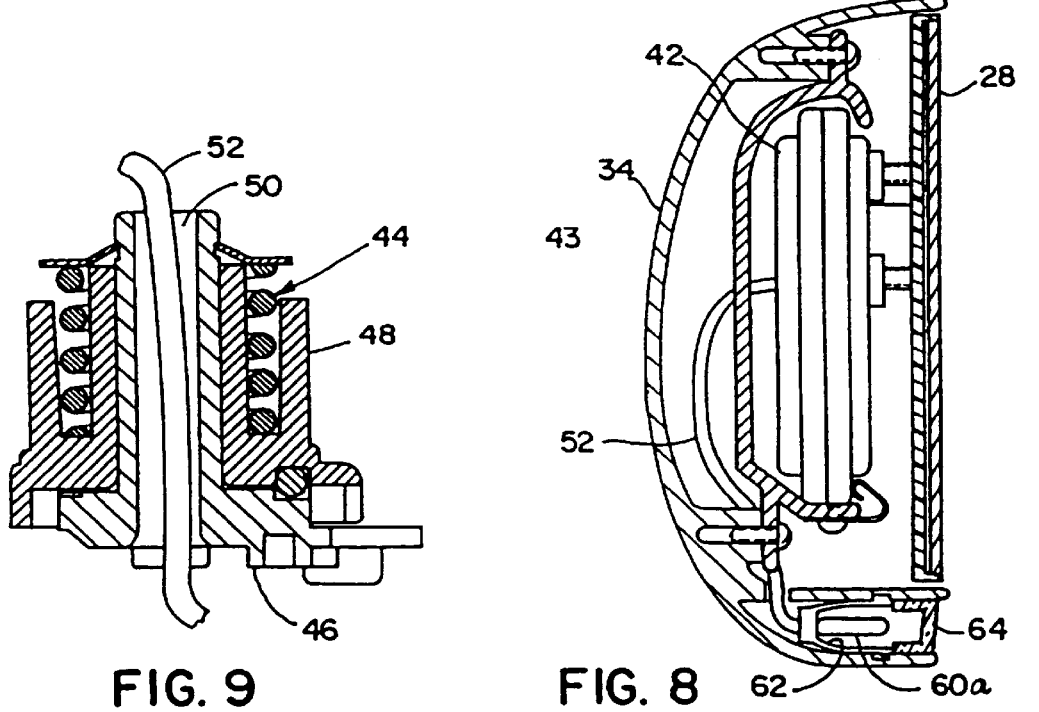
FIG. 8 is a sectional view taken along the lines VIII—VIII in FIG. 7.
Figure 20:
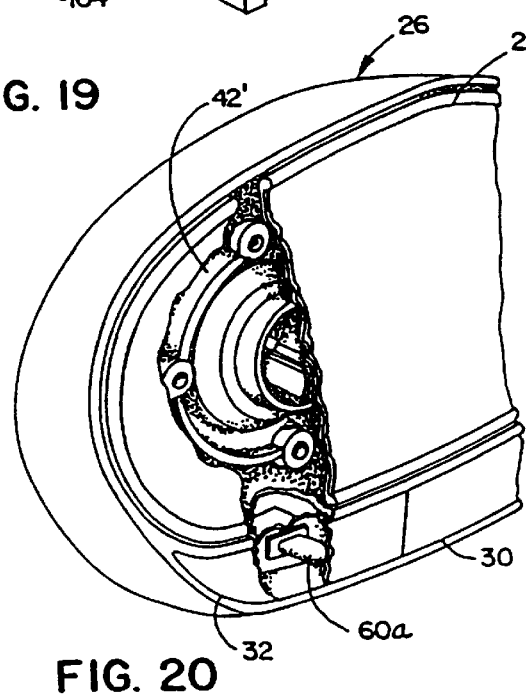
FIG. 20 is the same view as FIG. 7 of the invention embodied in an alternative mirror structure.

With reference to FIGS. 7 and 8, as is conventional, reflectance element 28 is mounted to a bracket 43 by an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater (not shown) as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10–12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 14:
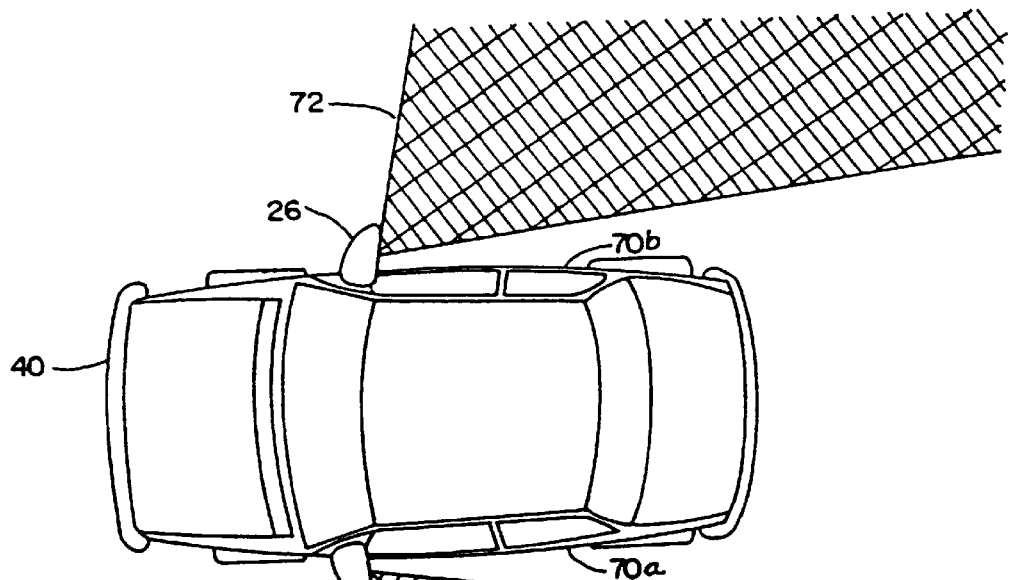
FIG. 14 is a top plan view of the vehicle and light pattern in FIG. 13.
Figure 15:
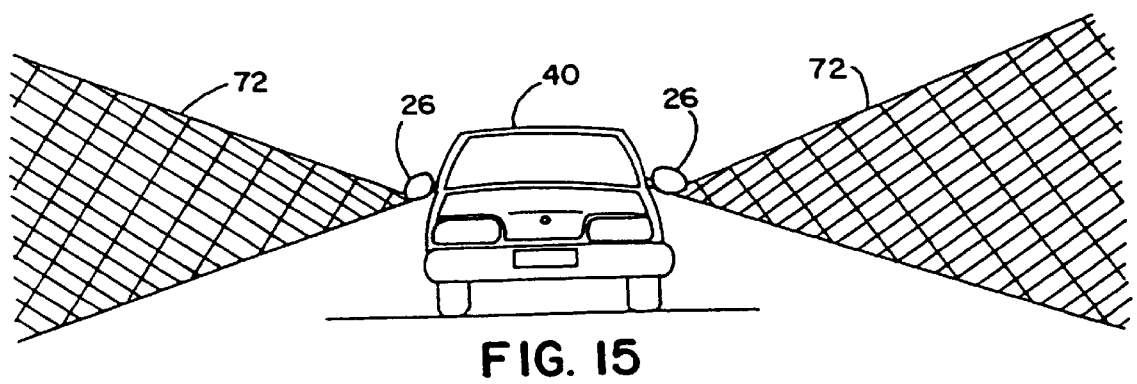
FIG. 15 is a rear elevation of the vehicle and light pattern in FIG. 13.

Signal light 32 generates a light pattern 72, which is directed generally horizontally rearwardly of vehicle 40 (FIGS. 13–15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in the illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, and includes an output 86 in order to operate remote door lock circuit 88, as is conventional. Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
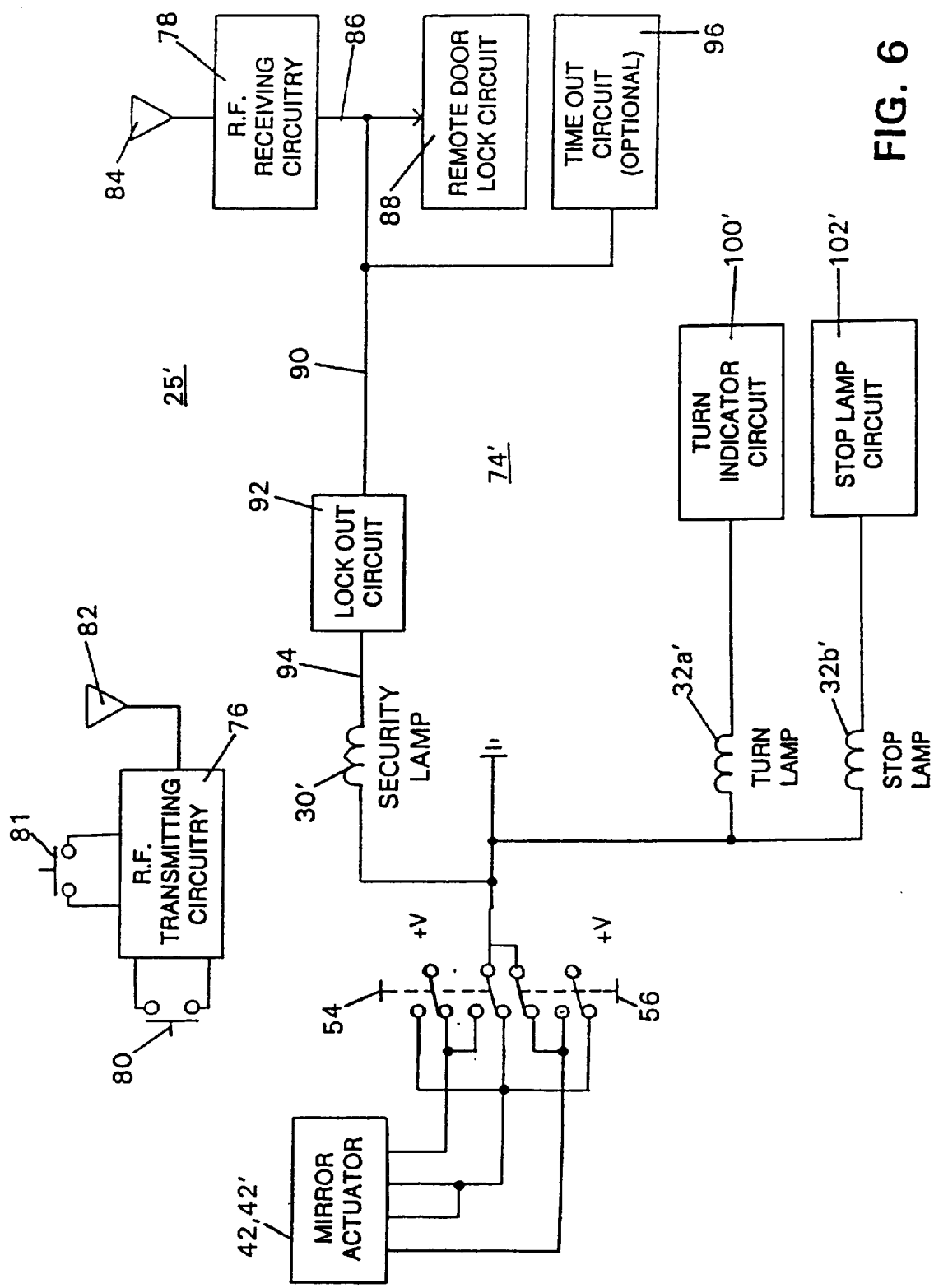
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
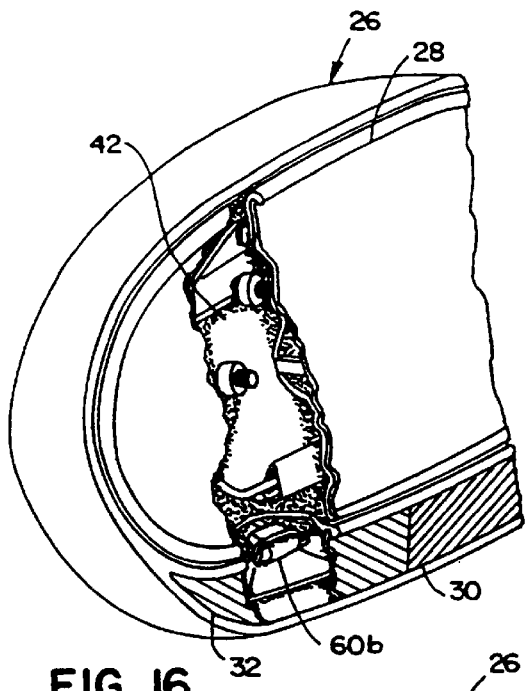
FIG. 16 is the same view as FIG. 7 of a first alternative light source according to the invention.
Figure 17:
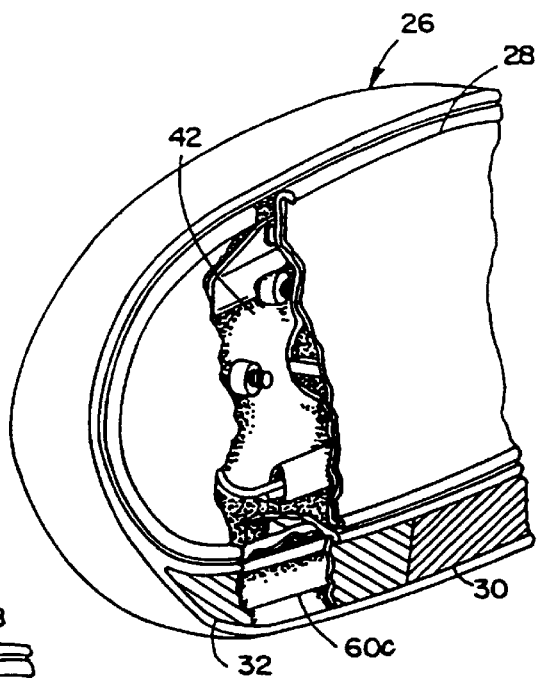
FIG. 17 is the same view as FIG. 7 of a second alternative light source.
Figure 18:
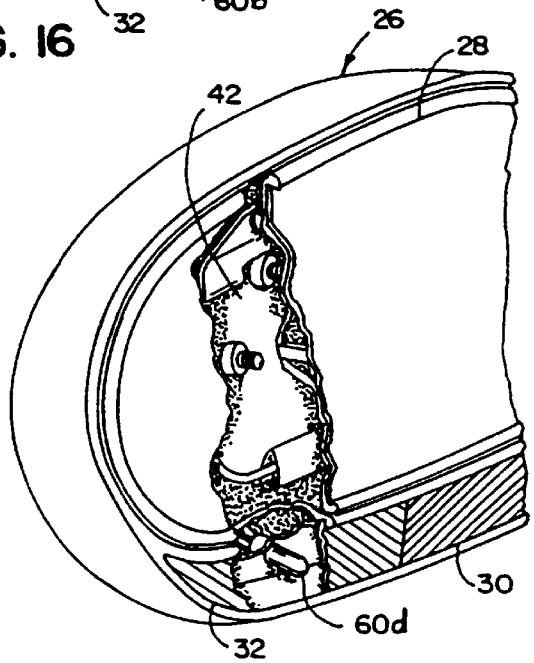
FIG. 18 is the same view as FIG. 7 of a third alternative light source.
Figure 19:
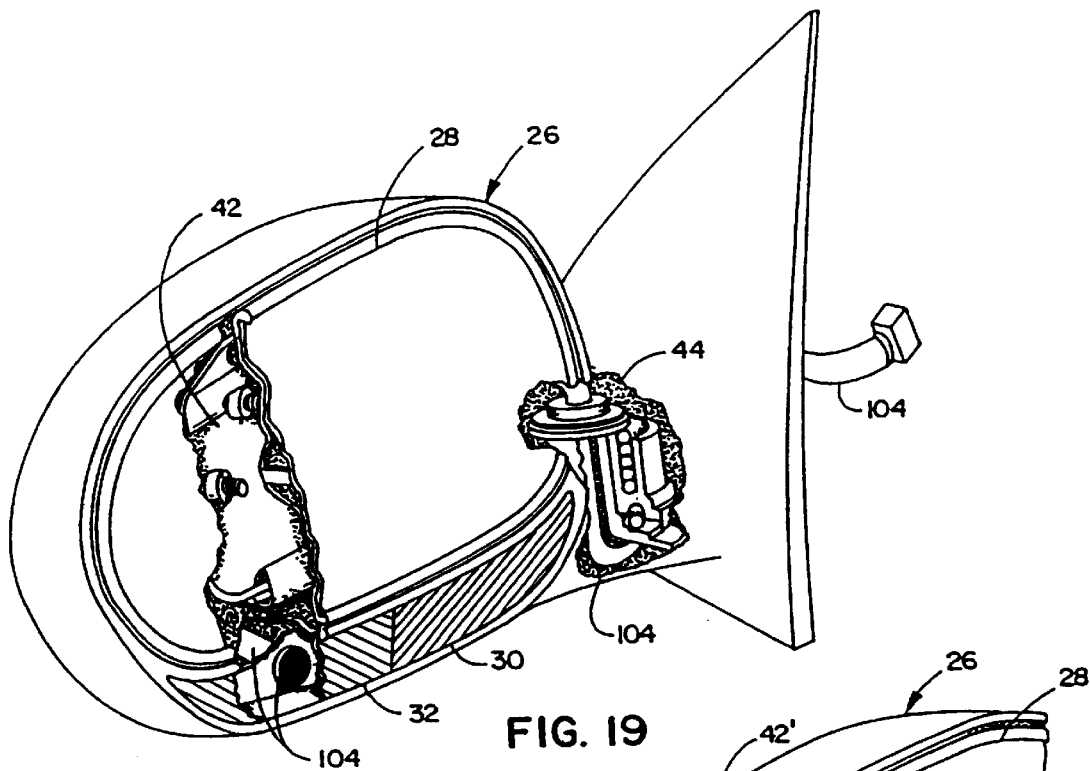
FIG. 19 is the same view as FIG. 7 of a fourth alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Changes and modifications in the specifically described embodiments can be carried out without departing from the principles of the invention, which is intended to be limited only by the scope of the appended claims, as interpreted according to the principles of patent law including the Doctrine of Equivalents.

What is claimed is:

1. A security lighted exterior rearview mirror system for a vehicle, comprising;

an exterior rearview mirror assembly adapted for mounting to a side of a vehicle, said assembly including a housing and a mount for attachment to the side of the vehicle;

said assembly including a reflective element and an actuator for positioning said reflective element about at least one axis, said reflective element positioned in said housing;

said assembly further including a floodlight, said floodlight projecting a pattern of light from said assembly on at least an area adjacent a portion of the vehicle in order to create a lighted security zone in said area when said assembly is mounted to the side of the vehicle;

said floodlight comprising a light source and a lens, said light source selected from the group consisting of an incandescent lamp, a halogen lamp, a vacuum fluorescent lamp, a light emitting diode and a light pipe;

said floodlight adapted to project said pattern of light generally rearwardly and downwardly to contact the ground at a vicinity of entry and exit by occupants of the vehicle to establish a lighted security zone;

a control system including a base unit in the vehicle and a remote transmitter wherein said base unit is responsive to a signal from said remote transmitter in order to actuate said floodlight, said remote transmitter comprising a transmitting device carried by a vehicle operator;

said control system actuating said floodlight upon occurrence of a given event and said control system further including a timeout circuit that deactuates said actuated floodlight after a delay;

said given event comprising opening a door of the vehicle; and wherein said control system includes connection with an interior light circuit for actuating a vehicular interior light whereby said interior light actuates upon occurrence of said given event and said timeout circuit deactuates said actuated interior light after said delay.

2. The security lighted exterior rearview mirror system of claim 1 wherein said floodlight comprises a reflector behind said lens.

3. The security lighted exterior rearview mirror system of claim 1 wherein said floodlight comprises a non-filtering lens.

4. The security lighted exterior rearview mirror system of claim 3 wherein said pattern of light comprises white light.

5. The security lighted exterior rearview mirror system of claim 1 wherein said pattern of light comprises white light.

6. The security lighted exterior rearview mirror system of claim 1 wherein said lens is selected from the group consisting of a segmented lens, a prismatic lens, and a Fresnel lens.

7. The security lighted exterior rearview mirror system of claim 6 wherein said lens comprises a segmented lens.

8. The security lighted exterior rearview mirror system of claim 6 wherein said lens comprises a prismatic lens.

9. The security lighted exterior rearview mirror system of claim 6 wherein said lens comprises a Fresnel lens.

10. The security lighted exterior rearview mirror system of claim 1 wherein said light source comprises an incandescent lamp.

11. The security lighted exterior rearview mirror system of claim 6 wherein said light source comprises an incandescent lamp.

12. The security lighted exterior rearview mirror system of claim 6 wherein said light source comprises a halogen lamp.

13. The security lighted exterior rearview mirror system of claim 1 wherein said light source comprises a halogen lamp.

14. The security lighted exterior rearview mirror system of claim 1 wherein said light source comprises a light emitting diode.

15. The security lighted exterior rearview mirror system of claim 1 wherein said light source comprises a light pipe.

16. The security lighted exterior rearview mirror system of claim 1 wherein said mount for attachment to said side of the vehicle forms a rigid mount to said side.

17. The security lighted exterior rearview mirror system of claim 1 wherein said mount for attachment to said side of the vehicle forms a breakaway joint to said side.

18. The security lighted exterior rearview mirror system of claim 17 wherein said breakaway joint mount comprises a wire-way for passage of wires.

19. The security lighted exterior rearview mirror system of claim 17 wherein said pattern of light projected by said floodlight extends rearwardly from said assembly without projecting a portion of said light pattern forwardly of said assembly.

20. The security lighted exterior rearview mirror system of claim 16 wherein said pattern of light projected by said floodlight extends rearwardly from said assembly without projecting a portion of said light pattern forwardly of said assembly.

21. The security lighted exterior rearview mirror system of claim 1 wherein said pattern of light projected by said floodlight extends rearwardly from said assembly without projecting a portion of said light pattern forwardly of said assembly.

22. The security lighted exterior rearview mirror system of claim 1 wherein said reflective element is an electro-optic mirror.

23. The security lighted exterior rearview mirror system of claim 22 wherein said electro-optic mirror is an electrochromic mirror.

24. The security lighted exterior rearview mirror system of claim 1 wherein said assembly includes a signal light.

25. The security lighted exterior rearview mirror system of claim 24 wherein said signal light comprises a turn signal light.

26. The security lighted exterior rearview mirror system of claim 1 wherein said lighted security zone extends from a vehicle door to the rear of the vehicle.

27. The security lighted exterior rearview mirror system of claim 1 wherein said control system further includes connection with a door lock circuit of the vehicle whereby locking/unlocking of doors of the vehicle is responsive to a signal remotely transmitted from said remote transmitter.

28. The security lighted exterior rearview mirror system of claim 1 wherein said signal from said remote transmitter to said base unit comprises a radio frequency signal.

29. The security lighted exterior rearview mirror system of claim 1 wherein said signal from said remote transmitter to said base unit comprises an infrared signal.

30. A security lighted exterior rearview mirror system for a vehicle comprising;

an exterior rearview mirror assembly adapted for mounting to a side of a vehicle, said assembly including a housing and a mount for attachment to the side of the vehicle;

said mount for attachment to said side of the vehicle forming a breakaway joint to said side;

said assembly including a reflective element and an actuator for positioning said reflective element about at least one axis, said reflective element positioned in said housing;

said assembly further including a floodlight, said floodlight projecting a pattern of light from said assembly on at least an area adjacent a portion of the vehicle in order to create a lighted security zone in said area when said assembly is mounted to the side of the vehicle;

said floodlight comprising a lens, said floodlight having a light source behind said lens;

said floodlight adapted to project said pattern of light generally rearwardly and downwardly to contact the ground at a vicinity of entry and exit by occupants of the vehicle to establish a lighted security zone;

a control system including a base unit in the vehicle and a remote transmitter wherein said base unit is responsive to a signal from said remote transmitter in order to actuate said floodlight, said remote transmitter comprising a transmitting device carried by a vehicle operator;

said control system actuating said floodlight upon occurrence of a given event and said control system further including a timeout circuit that deactuates said actuated floodlight after a delay; and said given event comprising opening a door of the vehicle.

31. The security lighted exterior rearview mirror system of claim 30 wherein said mount comprises a wire-way through which a wire cable passes.

32. The security lighted exterior rearview mirror system of claim 30 wherein said lens comprises a non-filtering lens.

33. The security lighted exterior rearview mirror system of claim 32 wherein said pattern of light comprises white light.

34. The security lighted exterior rearview mirror system of claim 30 wherein said pattern of light comprises white light.

35. The security lighted exterior rearview mirror system of claim 31 wherein said lens is selected from the group consisting of a segmented lens, a prismatic lens, and a Fresnel lens.

36. The security lighted exterior rearview mirror system of claim 30 wherein said lens comprises a segmented lens.

37. The security lighted exterior rearview mirror system of claim 30 wherein said lens comprises a prismatic lens.

38. The security lighted exterior rearview mirror system of claim 30 wherein said lens comprises a Fresnel lens.

39. The security lighted exterior rearview mirror system of claim 30 wherein said light source comprises an incandescent lamp.

40. The security lighted exterior rearview mirror system of claim 30 wherein said light source comprises an incandescent fuse lamp.

41. The security lighted exterior rearview mirror system of claim 30 wherein said light source comprises a halogen lamp.

42. The security lighted exterior rearview mirror system of claim 30 wherein a heater is provided to evaporate ice and dew from said reflective element positioned in said housing.

43. The security lighted exterior rearview mirror system of claim 31 wherein a heater is provided to evaporate ice and dew from said reflective element positioned in said housing and wherein power for said heater is supplied through said wire cable.

44. The security lighted exterior rearview mirror system of claim 30 wherein said pattern of light projected by said floodlight extends rearwardly from said assembly without projecting a portion of said light pattern forwardly of said assembly.

45. The security lighted exterior rearview mirror system of claim 30 wherein said reflective element comprises a glass element having a first surface and a second surface, said glass element coated on one of said first surface and said second surface with a reflective layer.

46. The security lighted exterior rearview mirror system of claim 30 wherein said reflective element is an electro-optic mirror.

47. The security lighted exterior rearview mirror system of claim 46 wherein said electro-optic mirror is an electrochromic mirror.

48. The security lighted exterior rearview mirror system of claim 30 wherein said assembly includes a signal light.

49. The security lighted exterior rearview mirror system of claim 48 wherein said signal light comprises a turn signal light.

50. The security lighted exterior rearview mirror system of claim 31 wherein said reflective element is an electrochromic mirror and wherein signals to control the level of reflectivity of said electrochromic mirror reflective element pass through said wire cable.

51. The security lighted exterior rearview mirror system of claim 30 wherein said light source comprises a light pipe.

52. The security lighted exterior rearview mirror system of claim 51 wherein said light pipe comprises a fibre optic bundle.

53. The security lighted exterior rearview mirror system of claim 31 wherein said light source comprises a light pipe, wherein said light pipe comprises a fibre optic bundle, and wherein said fibre optic bundle passes through said wireway.

54. The security lighted exterior rearview mirror system of claim 30 wherein said lighted security zone extends from a vehicle door to the rear of the vehicle.

55. The security lighted exterior rearview mirror system of claim 31 wherein said wire cable includes wires supplying control signals to said actuator for positioning said reflective element.

56. The security lighted exterior rearview mirror system of claim 30 wherein said light source comprises a light emitting diode.

57. The security lighted exterior rearview mirror system of claim 30 wherein said control system includes connection with an interior light circuit for actuating a vehicular interior light whereby said interior light actuates upon occurrence of said given event and said timeout circuit deactuates said actuated interior light after said delay.

58. The security lighted exterior rearview mirror system of claim 30 wherein said control system further includes connection with a door lock circuit of the vehicle whereby locking/unlocking of doors of the vehicle is responsive to a signal remotely transmitted from said remote transmitter.

59. The security lighted exterior rearview mirror system of claim 30 wherein said signal from said remote transmitter to said base unit comprises a radio frequency signal.

60. The security lighted exterior rearview mirror system of claim 30 wherein said signal from said remote transmitter to said base unit comprises an infrared signal.

61. A security lighted exterior rearview mirror system for a vehicle, comprising;
an exterior rearview mirror assembly adapted for mounting to a side of a vehicle, said assembly including a housing and a breakaway mount for attachment to the side of the vehicle;
said breakaway mount including a stationary member adapted for attachment to the side of the vehicle and a pivoting member providing breakaway motion for said housing with respect to said stationary member;
said assembly including a reflective element and an actuator for positioning said reflective element about an axis, said reflective element positioned in said housing;
said assembly further including a floodlight, said floodlight projecting a pattern of light from said assembly on at least an area adjacent a portion of the vehicle in order to create a lighted security zone in said area when said assembly is mounted to the side of the vehicle;
said floodlight adapted to project said pattern of light generally rearwardly and downwardly to contact the ground at a vicinity of entry and exit by occupants of the vehicle to establish a lighted security zone;
said floodlight comprising a light source selected from the group consisting of an incandescent lamp, a halogen lamp, a vacuum fluorescent lamp, a light emitting diode and a light pipe;
a control system including a base unit in the vehicle and a remote transmitter wherein said base unit is responsive to a signal from said remote transmitter in order to actuate said floodlight, said remote transmitter comprising a transmitting device carried by a vehicle operator, said control system further including connection with a door lock circuit of the vehicle whereby locking/unlocking of doors of the vehicle is responsive to a signal remotely transmitted from said remote transmitter;
said control system including a timeout circuit that deactuates said floodlight after a delay upon occurrence of a given event; and
said given event comprising opening a door of the vehicle and whereby said floodlight is actuated in response to entry to or exit from the vehicle without transmission of a signal from said remote transmitter upon occurrence of said given event.

62. The security lighted exterior rearview mirror system of claim 61 wherein said floodlight comprises a lens.

63. The security lighted exterior rearview mirror system of claim 62 wherein said lens comprises a non-filtering lens.

64. The security lighted exterior rearview mirror system of claim 63 wherein said pattern of light comprises white light.

65. The security lighted exterior rearview mirror system of claim 61 wherein said pattern of light comprises white light.

66. The security lighted exterior rearview mirror system of claim 62 wherein said lens is selected from the group consisting of a segmented lens, a prismatic lens, and a Fresnel lens.

67. The security lighted exterior rearview mirror system of claim 62 wherein said lens comprises a segmented lens.

68. The security lighted exterior rearview mirror system of claim 62 wherein said lens comprises a prismatic lens.

69. The security lighted exterior rearview mirror system of claim 62 wherein said lens comprises a Fresnel lens.

70. The security lighted exterior rearview mirror system of claim 61 wherein said light source comprises an incandescent lamp.

71. The security lighted exterior rearview mirror system of claim 70 wherein said light source comprises an incandescent fuse lamp.

72. The security lighted exterior rearview mirror system of claim 61 wherein said light source comprises a halogen lamp.

73. The security lighted exterior rearview mirror system of claim 61 wherein a heater is positioned in said housing to evaporate ice and dew from said reflective element.

74. The security lighted exterior rearview mirror system of claim 73 wherein power for said heater is supplied through a wire cable, said wire cable passing through said breakaway mount.

75. The security lighted exterior rearview mirror system of claim 61 wherein said pattern of light projected by said floodlight extends rearwardly from a door of the vehicle to the rear of the vehicle.

76. The security lighted exterior rearview mirror system of claim 61 wherein said reflective element comprises a glass element having a first surface and a second surface, said glass element coated on one of said first surface and said second surface with a reflective layer.

77. The security lighted exterior rearview mirror system of claim 74 wherein said reflective element is an electro-optic mirror.

78. The security lighted exterior rearview mirror system of claim 77 wherein said electro-optic mirror is an electrochromic mirror.

79. The security lighted exterior rearview mirror system of claim 61 wherein said assembly includes a signal light.

80. The security lighted exterior rearview mirror system of claim 79 wherein said signal light comprises a turn signal light.

81. The security lighted exterior rearview mirror system of claim 78 wherein signals to control the level of reflectivity of said electrochromic mirror reflective element pass through said wire cable.

82. The security lighted exterior rearview mirror system of claim 61 wherein said light source comprises a light pipe.

83. The security lighted exterior rearview mirror system of claim 82 wherein said light pipe comprises a fibre optic bundle.

84. The security lighted exterior rearview mirror system of claim 61 wherein said lighted security zone extends from a door of the vehicle to the rear of the vehicle.

85. The security lighted exterior rearview mirror system of claim 61 wherein said control system includes connection with an interior light circuit for actuating a vehicular interior light whereby said interior light actuates upon occurrence of said given event and said timeout circuit deactuates said actuated interior light after said delay.

86. The security lighted exterior rearview mirror system of claim 61 wherein said signal from said remote transmitter to said base unit comprises a radio frequency signal.

87. The security lighted exterior rearview mirror system of claim 61 wherein said signal from said remote transmitter to said base unit comprises an infrared signal.

88. A security lighted exterior rearview mirror system for a vehicle, comprising;

an exterior rearview mirror assembly adapted for mounting to a side of a vehicle, said assembly including a housing and a mount for attachment to the side of the vehicle;

said assembly including a reflective element, an actuator for positioning said reflective element about an axis and a heater to evaporate ice and dew from said reflective element, said reflective element, said actuator and said heater positioned in said housing;

said assembly further including a floodlight, said floodlight projecting a pattern of light from said assembly on at least an area adjacent a portion of the vehicle in order to create a lighted security zone in said area when said assembly is mounted to the side of the vehicle;

said floodlight comprising a light source;

said floodlight adapted to project said pattern of light generally rearwardly and downwardly to contact the ground at a vicinity of entry and exit by occupants of the vehicle to establish a lighted security zone;

a control system including a base unit in the vehicle and a remote transmitter wherein said base unit is responsive to a signal from said remote transmitter in order to actuate said floodlight, said remote transmitter comprising a transmitting device carried by a vehicle operator, said control system further including connection with a door lock circuit of the vehicle whereby locking/unlocking of doors of the vehicle is responsive to a signal remotely transmitted from said remote transmitter;

said control system actuating said floodlight upon occurrence of a given event and said control system further including a timeout circuit that deactuates said actuated floodlight after a delay;

said given event comprising opening a door of the vehicle; and wherein power for said heater is supplied through a wire cable, said wire cable passing through said mount.

89. The security lighted exterior rearview mirror system of claim 88 wherein said floodlight comprises a lens.

90. The security lighted exterior rearview mirror system of claim 89 wherein said lens comprises a non-filtering lens.

91. The security lighted exterior rearview mirror system of claim 90 wherein said pattern of light comprises white light.

92. The security lighted exterior rearview mirror system of claim 88 wherein said pattern of light comprises white light.

93. The security lighted exterior rearview mirror system of claim 90 wherein said lens is selected from the group consisting of a segmented lens, a prismatic lens, and a Fresnel lens.

94. The security lighted exterior rearview mirror system of claim 89 wherein said lens comprises a segmented lens.

95. The security lighted exterior rearview mirror system of claim 89 wherein said lens comprises a prismatic lens.

96. The security lighted exterior rearview mirror system of claim 89 wherein said lens comprises a Fresnel lens.

97. The security lighted exterior rearview mirror system of claim 88 wherein said light source comprises an incandescent lamp.

98. The security lighted exterior rearview mirror system of claim 97 wherein said light source comprises an incandescent fuse lamp.

99. The security lighted exterior rearview mirror system of claim 88 wherein said light source comprises a halogen lamp.

100. The security lighted exterior rearview mirror system of claim 88 wherein floodlight further comprises a reflector and wherein said light source is selected from the group consisting of an incandescent lamp, a halogen lamp, a vacuum fluorescent lamp, a light emitting diode and a light pipe.

101. The security lighted exterior rearview mirror system of claim 88 wherein said mount comprises a rigid mount.

102. The security lighted exterior rearview mirror system of claim 88 wherein said mount comprises a breakaway mount, said breakaway mount including a stationary member adapted for attachment to the side of the vehicle and a pivoting member providing breakaway motion for said housing with respect to said stationary member.

103. The security lighted exterior rearview mirror system of claim 88 wherein said reflective element comprises a glass element having a first surface and a second surface, said glass element coated on one of said first surface and said second surface with a reflective layer.

104. The security lighted exterior rearview mirror system of claim 88 wherein said reflective element is an electro-optic mirror.

105. The security lighted exterior rearview mirror system of claim 104 wherein said electro-optic mirror is an electrochromic mirror.

106. The security lighted exterior rearview mirror system of claim 88 wherein said assembly includes a signal light.

107. The security lighted exterior rearview mirror system of claim 106 wherein said signal light comprises a turn signal light.

108. The security lighted exterior rearview mirror system of claim 105 wherein signals to control the level of reflectivity of said electrochromic mirror reflective element pass through said wire cable.

109. The security lighted exterior rearview mirror system of claim 88 wherein said light source comprises a light pipe.

110. The security lighted exterior rearview mirror system of claim 109 wherein said light pipe comprises a fibre optic bundle.

111. The security lighted exterior rearview mirror system of claim 88 wherein said lighted security zone extends from a door of the vehicle to the rear of the vehicle.

112. The security lighted exterior rearview mirror system of claim 88 wherein said control system includes connection with an interior light circuit for actuating a vehicular interior light whereby said interior light actuates upon occurrence of said given event and said timeout circuit deactivates said actuated interior light after said delay.

113. The security lighted exterior rearview mirror system of claim 88 wherein said signal from said remote transmitter to said base unit comprises a radio frequency signal.

114. The security lighted exterior rearview mirror system of claim 88 wherein said signal from said remote transmitter to said base unit comprises an infrared signal.

* * * * *